United States Patent [19]

Stevenson

[11] Patent Number: 5,061,380
[45] Date of Patent: Oct. 29, 1991

[54] SCREENING SYSTEM AND METHOD

[75] Inventor: Christopher Stevenson, Stockport, United Kingdom

[73] Assignee: Mono Pumps Limited, Audenshaw, United Kingdom

[21] Appl. No.: 530,360

[22] Filed: May 31, 1990

[30] Foreign Application Priority Data

Aug. 25, 1989 [GB] United Kingdom ............... 8919332

[51] Int. Cl.⁵ .................................. C02F 3/00
[52] U.S. Cl. .................... 210/768; 210/601; 210/780; 210/806; 210/154; 210/161; 210/297; 210/298; 210/386; 210/391; 210/407; 198/608; 198/789; 198/784
[58] Field of Search ............ 210/601, 780, 806, 154, 210/161, 297, 298, 386, 391, 407; 198/608, 784, 789, 790

[56] References Cited

U.S. PATENT DOCUMENTS

| | | | |
|---|---|---|---|
| 2,885,079 | 5/1959 | Wormser | 210/154 |
| 3,002,625 | 10/1961 | Lannert | 210/173 |
| 3,870,627 | 3/1975 | Herkes | 198/784 |
| 4,919,346 | 4/1990 | Chambers | 210/173 |

OTHER PUBLICATIONS

Water and Waste-Water Technology, Author, Mark J. Hammer, copyright 1975, pp. (350-351) and (365-366).

*Primary Examiner*—Robert A. Dawson
*Assistant Examiner*—David Reifsnyder
*Attorney, Agent, or Firm*—Fleit, Jacobson, Cohn, Price, Holman & Stern

[57] ABSTRACT

The invention is a screening device suitable for screening a liquid material having solid matter suspended in it, which comprises a number of sets of discs, the discs of each set being rigidly mounted on a shaft, with the discs on each shaft being separated from one another axially, means mounting the shafts about parallel axes, with the discs of adjacent shafts being interleaved with one another and means to cause the shafts to rotate independently in the same rotational sense such that successive shafts rotate progressively faster to cause the solid matter suspended in the liquid material to be moved in a direction from the slowest shaft to the fastest shaft. The device is used particularly in sewage processing plants.

8 Claims, 4 Drawing Sheets

SCREENING SYSTEM AND METHOD

The present invention relates to the screening of liquid material having solid matter suspended in it, in particular to the screening of sewage waste.

Many industries need to handle large volumes of liquid material which requires processing or treatment. In some cases that treatment involves screening, or coarse sifting, the liquid to remove solid matter suspended in it. The processing of sewage is one such example.

In plants involving treatment works of this type, the standard method used to separate solid matter from the liquid material is to provide a belt screen which consists of a wire mesh passing continuously around two rollers like a conveyor belt. The belt screen may be arranged at an angle from the vertical, with the belt moving in an upwardly direction relative to the liquid flow, such that the liquid has to pass through the wire mesh screen twice. This presents an undesirable degree of resistance to the flow of liquid being processed. Added disadvantages are the tendency of the wire mesh to clog up and further impede the liquid flow, and the fact that the individual wires of the mesh are prone to deform upon impact by large solids.

With these shortcomings in mind, there is now provided in accordance with the present invention a screening device suitable for screening a liquid material having solid matter suspended in it which comprises a number of sets of generally planar discs, the discs of each set being mounted on a shaft and separated from one another axially, means mounting the shafts upon parallel axes, the discs of adjacent shafts being interleaved with one another, and means to cause the shafts to rotate independently in the same rotational sense such that successive shafts rotate progressively faster, wherein the discs of each set are rigidly mounted on their associated shaft with the faces of each disc substantially perpendicular to the axis of the associated shaft, the said faces are flat and closely adjacent to the faces of the discs of the adjacent shaft or shafts, to define narrow, parallel-sided slots therebetween, whereby a liquid material having solid matter suspended in it is screened such that the solid matte suspended in the liquid material is moved in a direction from the slowest shaft to the fastest shaft.

The discs of a given shaft are substantially parallel to each other and closely adjacent to the discs of each adjacent shaft, with faces of the discs of adjacent shafts closely adjacent and the peripheries of the discs of each shaft being very close to the adjacent shaft itself. The spacing between the faces of the overlapping discs is typically from 0.5 to 10 mm, for example from 1 mm to 6 mm. A spacing of 1 mm, 3 mm or 6 mm is particularly preferred.

The diameter of each disc is generally large compared with the diameter of the associated shaft. The disc diameter is typically in the range from 150 to 300 mm, preferably from 180 to 250 mm. The shaft diameter, that is to say the minor diameter of the shaft space, is typically from 50 to 125 mm, preferably from 80 to 100 mm, and is selected according to the diameter of the discs to be mounted on the shaft, to give a close spacing between the periphery of each disc and the adjacent shaft itself. The spaces provided between the discs, and between the discs and the adjacent shafts, is thus the only passageway for material not retained by the screening device.

One or more scrapers are suitably included in the device attached to the discs, to remove material from the discs. At least some of the discs may be provided with serrations on their peripheries. In one such embodiment of the invention the discs of the last shaft not provided with serrations.

Advantages of the device are that it allows the liquid being processed to flow with minimum hindrance. Also, the discs are more resistant to impact by solid matter than are the individual wires of a mesh. The progressively faster motion of successive shafts means that the discs self-clean and the device has no tendency to become blocked up. The device also provides a finer screen than conventional devices; the spacing between adjacent bars in a conventional sewage screen is generally of the order of 20 mm, whereas in the present invention the spacing between adjacent discs is usually no greater than about 6 mm.

The device typically forms part of a processing system. The present invention accordingly further provides a system suitable for screening, macerating or conveying a liquid material having solid matter suspended in it, which incorporates a feed channel and a device of the invention mounted to extend across the feed channel.

The present invention also provides a method of screening, macerating or conveying a liquid material having solid matter suspended in it, which comprises passing the liquid material along a feed channel and over or through the device of the invention, the device being mounted to extend across the feed channel.

The device is suitably arranged in the system with the shafts of the discs either horizontal or vertical and may extend with a plane including the axes of the shafts either perpendicular to or at an angle across, the feed channel. When the shafts are vertical the device preferably extends with the plane including the axes of the shafts at an angle across the feed channel, with the faster moving discs then being further downstream.

The system enables the screenings to be removed and treated further. In the case of sewage treatment the screenings contain both biological matter and non-biodegradable material such as plastic, rubber and rags. The screenings are typically macerated and washed and the biological matter returned to the liquid flow for subsequent treatment and degradation downstream. For sewage treatment in particular the fact that the biological matter contained in the solids is not removed from the sewage flow altogether, as it is when a conventional mesh screen is used, is an advantage since it remains available for the downstream treatment.

Rather than being returned to the liquid flow, the disintegrated and washed screenings of a non-biodegradable nature are removed from the system altogether, in which case they are in an acceptably clean state for disposal.

The system need not necessarily include macerating and washing means; it is also suitable merely to provide a conveyor to remove all the screened solids from the screening device and out of the system.

The invention will be further described with reference to the accompanying drawings in which:

FIG. 1a shows the interleaved discs of the device in closer detail;

Figure 1:
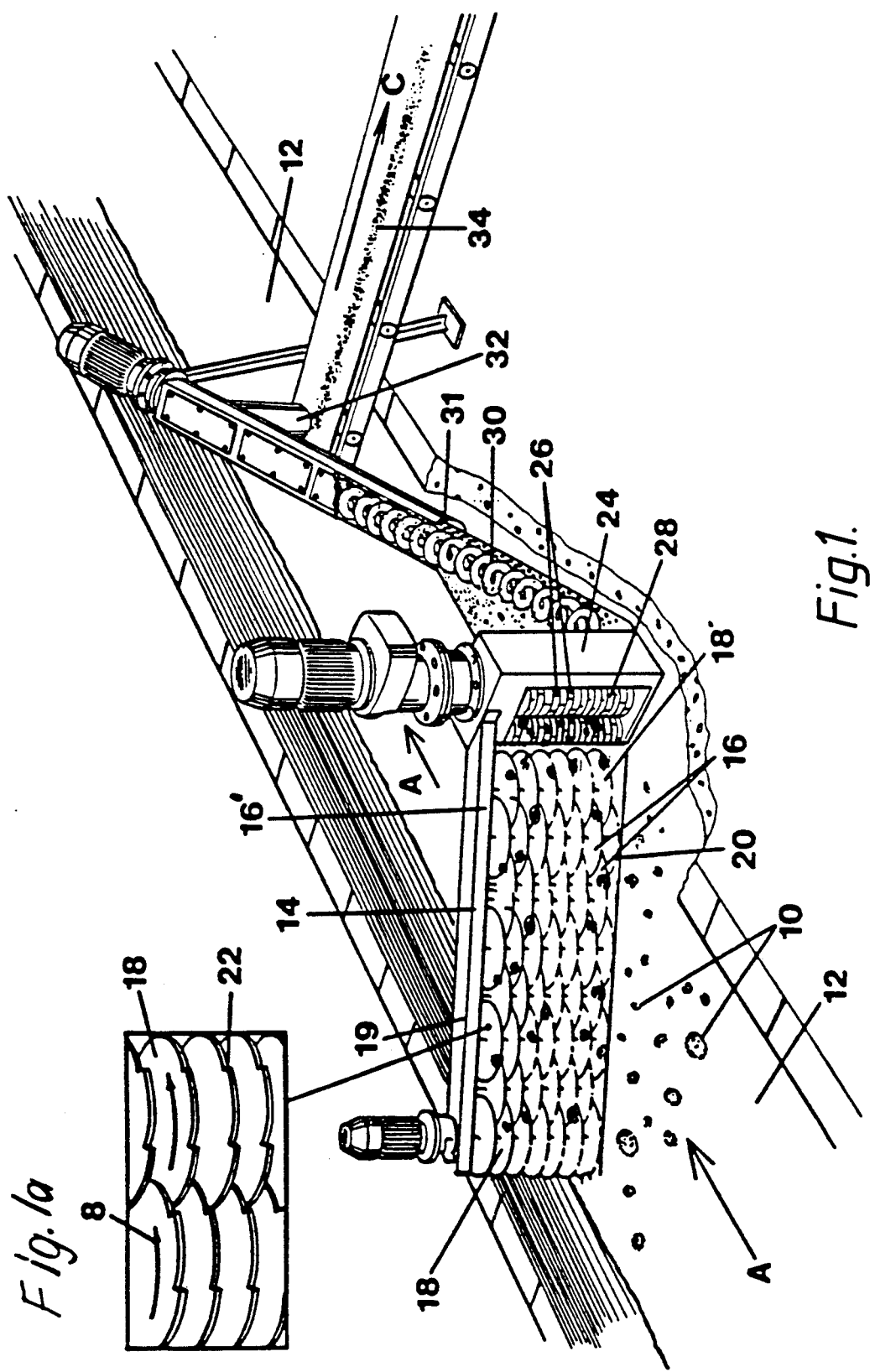
FIG. 1 shows the device, with the discs horizontal, as part of a screening, macerating and conveying system for sewage.

Referring first to FIGS. 1 and 1a, the crude sewage containing solids 10 flows along a feed channel 12 in the direction of arrow A to the device 14, which is mounted to extend at an angle across the feed channel. The device 14 comprises upper and lower members 19, 20 and discs 18 rigidly mounted on shafts 16 which are mounted for rotation about parallel axes in bearings supported by members 19 and 20. The discs, with the exception of the discs 18' mounted on the extreme right-hand shaft 16', bear serrations 22 on their peripheries. The shafts rotate and the discs all move in the same rotational sense, indicated by arrow B. Successive shafts move progressively faster with the righthand shaft 16' moving the fastest.

The liquid part of the sewage is able to flow through the device 14 without significant resistance so that screened sewage therefore continues along the feed channel 12 in the direction of arrow A'. A barrier to the solid matter in the sewage is presented by the rotating discs however. Owing to increasing speed of rotation of successive shafts, a positive displacement of the solids towards the fastest moving shaft 16' is promoted, whereupon the solids are either disintegrated in the flow or removed to a solids grinder 24 comprising two parallel shafts 26, mounted with discs 28, which rotate in opposite senses.

Once through the grinder, the material (screenings) is moved by an inclined upwardly helical conveyor 30 mounted above a screen 31. Water jets (not shown) spray water to wash the macerated screenings, which comprises both faecal matter and non-biodegradable material such as plastic and rubber. The macerated faecal matter is returned to the flow in the feed channel 12 through the screen 31 and is transported downstream for biological treatment, whereas the remaining material passes down a pipe 32 on to a conveyor belt 34 and is removed from the system in the direction of arrow C. FIG. 1a shows the interleaved arrangement of the discs 18, which in this embodiment are provided with serrations 22 In operation the discs 18 rotate in the sense indicated by arrow B.

Figure 2:
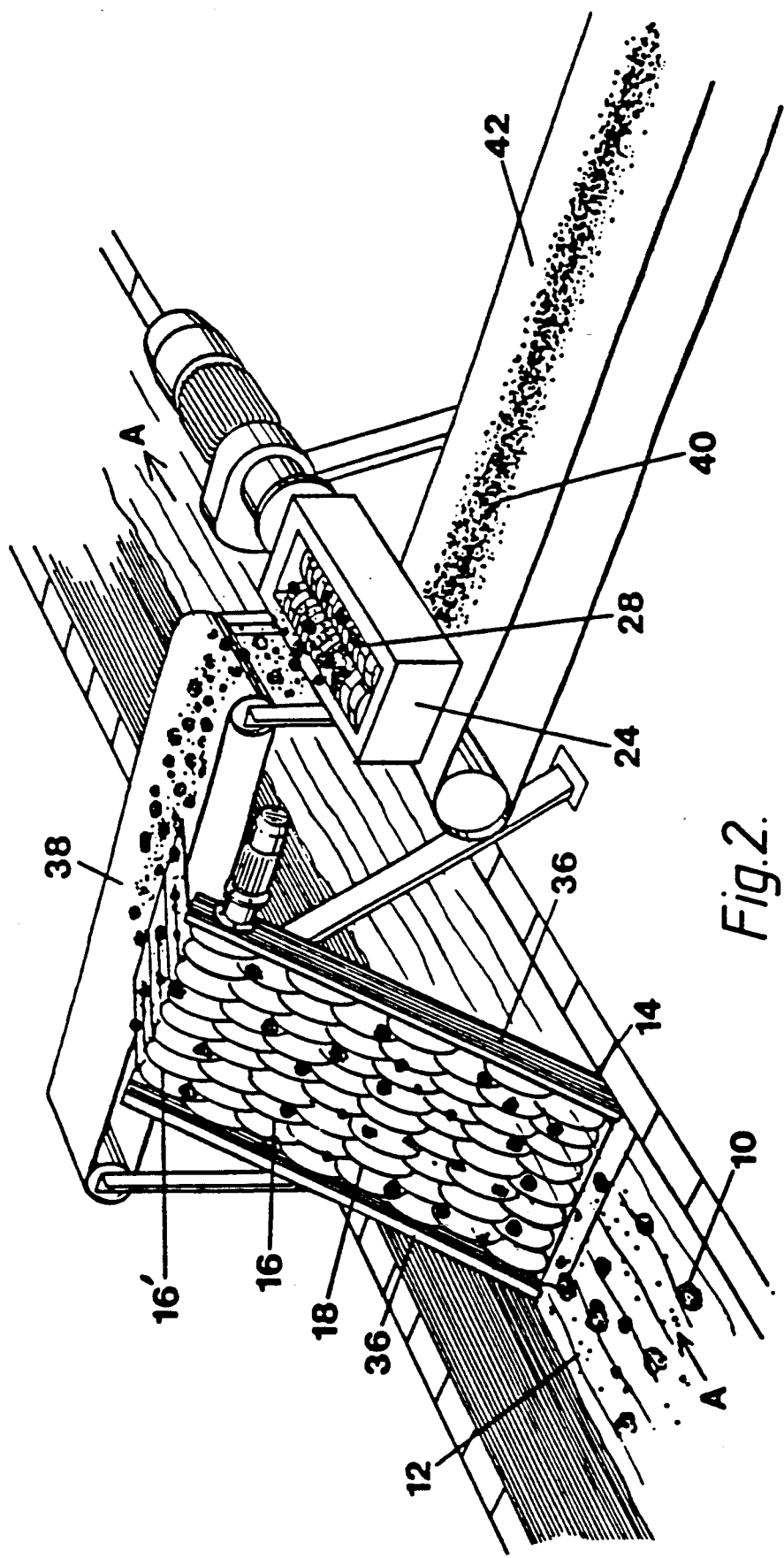
FIG. 2 shows the device with the discs vertical as part of a screening, macerating and conveying system for a liquid material containing solid matter.

Referring to FIG. 2, a modified device is shown in which liquid material comprising solid matter 10 flows in a feed channel 12 in the direction of arrow A. A device 14 is mounted to extend fully across the flow channel 12 and is inclined upwards and comprises two side members 36 and discs 18 mounted on horizontal shafts (not visible). The speed of rotation of the shafts progresses from the bottom to the top of the device to promote movement of the solids 10 in that direction once they reach the first shaft of the device. Liquid material continues to flow through the channel in the direction of arrow A. Like FIG. 1, the structure of FIG. 2 includes a grinder 24 having discs 28. This is fed by a conveyer belt 38 and the ground solid matter 40 is discharged via a further belt 42.

Figure 3:
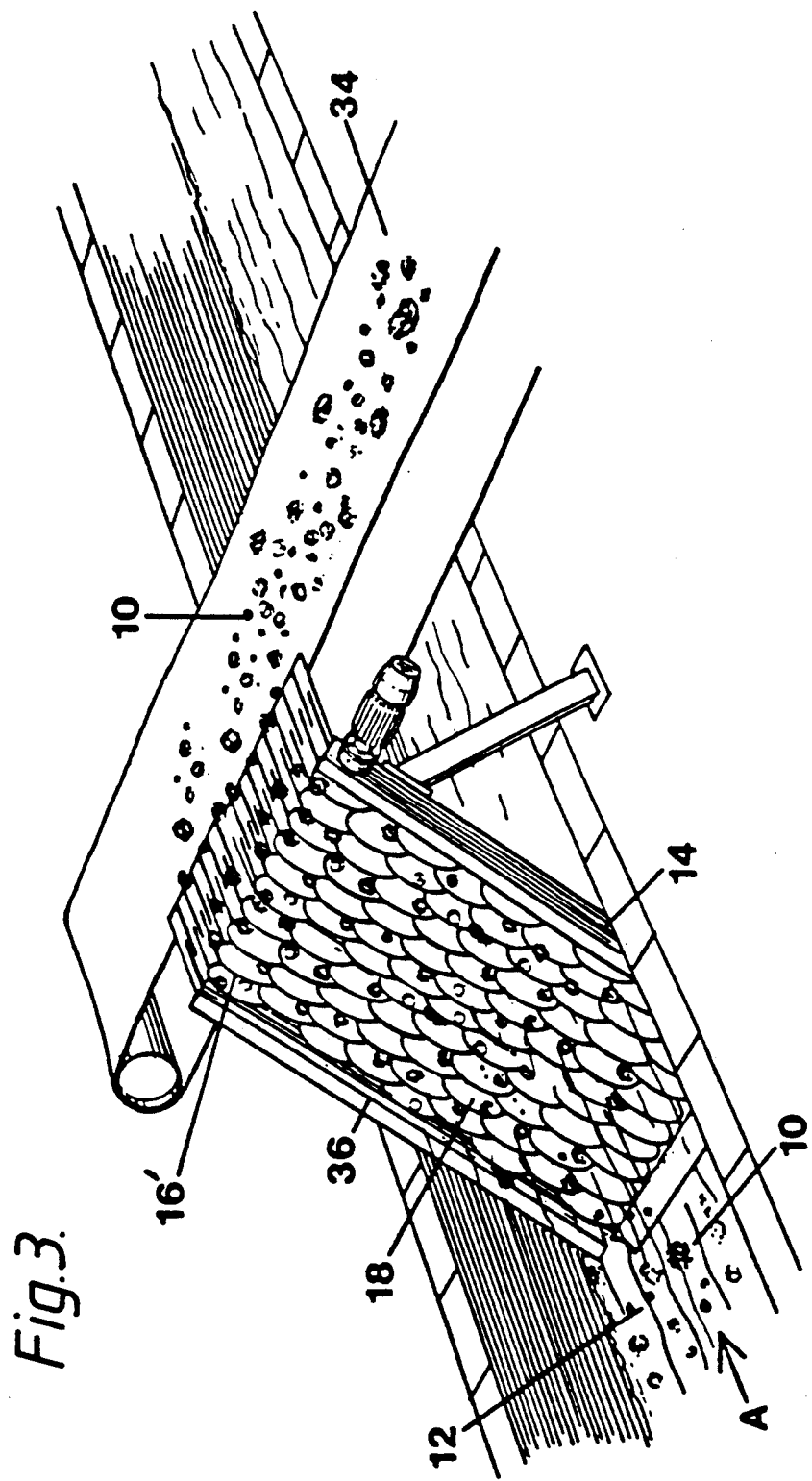
FIG. 3 shows the device with the discs vertical as part of a screening and conveying system for a liquid containing solid matter.

In FIG. 3 the liquid material containing solid matter 10 flows in the feed channel 12 in the direction of arrow A. A device 14 as described in connection with FIG. 1 is mounted with the shafts extending vertically at an angle across the feed channel. Whilst liquid material flows past the device, solid matter 10 is taken up on the discs 18, passes from left to right towards the fastest moving shaft 16', proceeds, as in FIG. 1, into an inclined helical conveyor 30 and continues down a pipe 32 on to a conveyor belt 34 which carries it out of the system.

Figure 4:
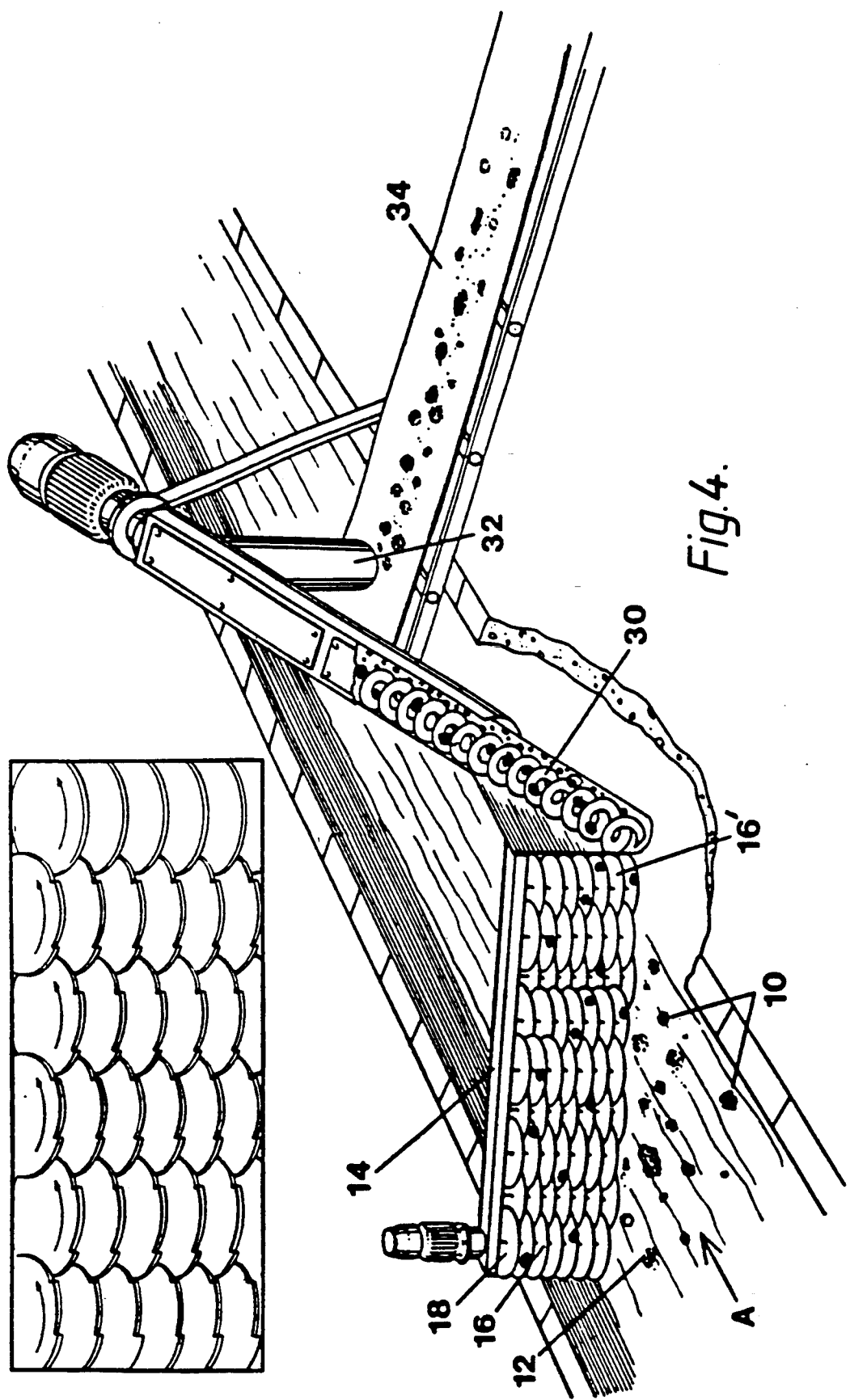
FIG. 4 shows the device with the discs horizontal as part of a screening and conveying system for a liquid containing solid matter.

Referring now to FIG. 4, solid matter 10 flows in feed channel 12 in the direction of arrow A. A device 14 comprising side members 36 and discs 18 axially mounted on shafts (not visible) is mounted to extend fully across the feed channel 12 as described in connection with FIG. 2. Liquid matter passes through the device to continue flowing in the feed channel whilst solid matter is taken up on the discs and carried as if on a conveyor belt towards the fastest moving shaft (not visible) at the upper end of the device. It passes to a conveyor belt 34 and out of the system.

One face of each disc could be provided with a radial rib to act as a moving wiper to clean the adjacent interleaved disc.

I claim:

1. A system suitable for screening, macerating or conveying a liquid material having solid matter suspended in it, said system comprising a channel along which the liquid material having solid matter suspended in it flows and a screening device suitable for screening a liquid material having solid matter suspended in it, which device comprises a plurality of parallel shafts, a plurality of sets of generally planar discs having opposite substantially parallel flat faces and circular peripheries, the discs of each set of discs being rigidly mounted to an associated one of said shafts and separated from one another axially with the plane of each disc being substantially perpendicular to the axis of an associated shaft, means mounting the shafts for rotation upon parallel vertical axes, the discs of adjacent shafts being interleaved with one another, whereby the faces of all of the discs are substantially horizontal, flat and closely adjacent to the faces of the discs of the adjacent shaft or shafts effective to define narrow parallel sided slots therebetween and means to cause the shafts to rotate independently in the same rotationally sense, said means being effective to cause successive shafts to rotate progressively faster, effective to cause the solid matter suspended in the liquid material to be moved laterally of said channel in a direction from a slowest one of said shafts to a fastest one of said shafts, said device being mounted whereby said shafts and the discs thereon extend across the full width of the channel and whereby said discs provide a barrier to solid matter in the liquid material while allowing the liquid material to flow through said slots.

2. A system according to claim 1 and further comprising scraper means associated with at least some of said discs, said scraper means being positioned effective to remove solid matter from the discs.

3. A system according to claim 1 and further comprising serrations on the peripheries of at least some of the discs.

4. A system according to claim 3 wherein the discs of the fastest shaft are not provided with serrations.

5. A system according to claim 1 and further comprising a macerator positioned effective to receive the solid matter from the discs of the fastest shaft.

6. A system according to claim 1 and further comprising, downstream of said device, a means for the biological treatment or degradation of the liquid material flowing in the feed channel.

7. A method of screening, macerating or conveying a liquid material having solid matter suspended in it, which comprises the steps of providing a channel, feeding the liquid material having solid matter suspended along said channel; mounting therein a screening device suitable for screening a liquid material having solid matter suspended in it, which device comprises a plurality of parallel shafts, a plurality of sets of generally planar discs each having opposite substantially parallel flat faces and circular peripheries the discs of each set of discs being rigidly mounted to an associate done of said shafts and separated from one another axially with the plane of each disc being substantially perpendicular to the axis of an associated shaft, means mounting the shafts for rotation upon parallel vertical axes, the discs of adjacent shafts being interleaved with one another, whereby the faces of all of the discs are substantially horizontal, flat and closely adjacent to the faces of the discs of the adjacent shaft or shafts effective to define n arrow parallel sided slots therebetween and means to cause the shafts to rotate independently in the same rotational sense, said means being effective to cause successive shafts to rotate progressively faster, effective to cause the solid matter suspended in the liquid material to be moved laterally of said channel in a direction from a slowest one of said shafts to a fastest one of said shafts, whereby said shafts and discs extend fully across the channel and whereby said discs provide a barrier to solid matter in the liquid material, and passing the said liquid material along said channel and through said device.

8. A method according to claim 7 in which the liquid material is raw sewage or sewage sludge.

* * * * *